(12) United States Patent
Starkey et al.

(10) Patent No.: US 9,975,366 B2
(45) Date of Patent: May 22, 2018

(54) MOTOR CONTROL SYSTEM

(71) Applicant: Markem-Imaje Industries Limited, Nottingham (GB)

(72) Inventors: Simon Starkey, Leicestershire (GB); Phillip Lakin, Nottingham (GB); Paul Christopher Roberts, Cambridge (GB); Jonathan Michael Gloag, Cambridgeshire (GB)

(73) Assignee: Markem-Imaje Industries Limited, Nottingham (GB)

( * ) Notice: Subject to any disclaimer, the term of this patent is extended or adjusted under 35 U.S.C. 154(b) by 0 days. days.

(21) Appl. No.: 15/154,886

(22) Filed: May 13, 2016

(65) Prior Publication Data

US 2016/0257152 A1 Sep. 8, 2016

Related U.S. Application Data

(63) Continuation of application No. 13/237,802, filed on Sep. 20, 2011, now Pat. No. 9,340,052.

(30) Foreign Application Priority Data

Aug. 10, 2011 (GB) .................................. 1113777.5

(51) Int. Cl.
*G05B 11/18* (2006.01)
*H01Q 1/28* (2006.01)
(Continued)

(52) U.S. Cl.
CPC .............. *B41J 33/16* (2013.01); *B41J 2/325* (2013.01); *B41J 33/14* (2013.01); *B41J 33/34* (2013.01);
(Continued)

(58) Field of Classification Search
CPC . B41J 33/14; B41J 33/32; B41J 33/34; G11B 15/32; G11B 15/43; G11B 15/46;
(Continued)

(56) References Cited

U.S. PATENT DOCUMENTS 4,232,257 A * 11/1980 Harshberger, Jr. .... G11B 15/54
  318/270
4,924,240 A 5/1990 Herbert et al.
(Continued)

FOREIGN PATENT DOCUMENTS

EP 745890 12/1996
EP 947345 3/2000
(Continued)

OTHER PUBLICATIONS

U.S. Appl. No. 14/179,832, Office Action Summary dated Dec. 16, 2014, 18 pages.
(Continued)

*Primary Examiner* — Bentsu Ro
*Assistant Examiner* — Zemenay Truneh
(74) *Attorney, Agent, or Firm* — Fish & Richardson P.C.

(57) ABSTRACT

Systems and apparatus relating to motor control (e.g., for thermal transfer printing) include, according to at least one implementation, a motor control system including: a position controller to receive a demanded position ($P_D$) input for controlling a motor; a torque controller coupled with the position controller, the torque controller to receive a torque bias ($T_B$) input for controlling the motor; and a feedback circuit coupled with the torque controller and the position controller; wherein the feedback circuit is configured and arranged to combine an output from the position controller, the output being generated based on the demanded position ($P_D$) input, with the torque bias ($T_B$) input to generate a torque demand ($T_D$) input to the torque controller.

19 Claims, 2 Drawing Sheets

(51) Int. Cl.

| | | |
|---|---|---|
| *B41J 33/16* | (2006.01) | |
| *B41J 33/14* | (2006.01) | |
| *G11B 15/32* | (2006.01) | |
| *H02P 6/16* | (2016.01) | |
| *B41J 33/34* | (2006.01) | |
| *G11B 15/43* | (2006.01) | |
| *G05B 19/19* | (2006.01) | |
| *B41J 2/325* | (2006.01) | |
| *G05B 11/36* | (2006.01) | |
| *G05B 11/42* | (2006.01) | |
| *H01Q 1/12* | (2006.01) | |

(52) U.S. Cl.
CPC .............. *G05B 11/36* (2013.01); *G05B 19/19* (2013.01); *G11B 15/32* (2013.01); *G11B 15/43* (2013.01); *H02P 6/16* (2013.01); *G05B 11/42* (2013.01); *G05B 2219/42062* (2013.01); *G05B 2219/42063* (2013.01); *G05B 2219/42123* (2013.01); *H01Q 1/125* (2013.01)

(58) Field of Classification Search
CPC .... H02P 6/16; H02P 6/22; H02P 6/165; H02P 7/00; H02P 3/00; H02P 7/06
USPC .......................................................... 318/59
See application file for complete search history.

(56) References Cited

U.S. PATENT DOCUMENTS

| | | | |
|---|---|---|---|
| 5,254,924 A | 10/1993 | Ogasawara | |
| 5,325,115 A | 6/1994 | Tanahashi | |
| 5,614,803 A | 3/1997 | Morioka et al. | |
| 5,619,112 A * | 4/1997 | Younessi | H02P 6/30 318/436 |
| 5,751,331 A | 5/1998 | Higuchi et al. | |
| 5,908,251 A | 6/1999 | Buckby | |
| 5,921,689 A | 7/1999 | Buckby | |
| 5,975,777 A | 11/1999 | Nelson et al. | |
| 5,986,422 A | 11/1999 | Iwashita et al. | |
| 6,068,206 A | 5/2000 | Lindsay, Jr. | |
| 6,082,914 A | 7/2000 | Barrus et al. | |
| 6,204,823 B1 * | 3/2001 | Spano | H01Q 1/125 343/705 |
| 6,305,629 B1 | 10/2001 | Chliwnyj et al. | |
| 6,434,988 B1 * | 8/2002 | Suzuki | B21H 1/06 72/105 |
| 6,757,129 B2 | 6/2004 | Kuroiwa et al. | |
| 6,975,087 B1 | 12/2005 | Crabill et al. | |
| 7,150,572 B2 | 12/2006 | McNestry et al. | |
| 7,682,094 B2 | 3/2010 | McNestry | |
| 7,722,268 B2 | 5/2010 | McNestry | |
| 7,748,917 B2 | 7/2010 | McNestry | |
| 7,753,605 B2 | 7/2010 | McNestry | |
| 8,007,190 B2 | 8/2011 | McNestry | |
| 8,096,715 B2 | 1/2012 | McNestry | |
| 8,221,009 B2 | 7/2012 | McNestry | |
| 8,221,010 B2 | 7/2012 | McNestry | |
| 8,317,421 B2 | 11/2012 | McNestry et al. | |
| 8,328,441 B2 | 12/2012 | McNestry | |
| 8,591,127 B2 | 11/2013 | McNestry | |
| 8,730,287 B2 | 5/2014 | Bouverie et al. | |
| 8,770,874 B2 | 7/2014 | McNestry et al. | |
| 2003/0049065 A1 | 3/2003 | Barrus et al. | |
| 2004/0146331 A1 | 7/2004 | McNestry et al. | |
| 2008/0217454 A1 | 9/2008 | Trago | |
| 2008/0219740 A1 | 9/2008 | McNestry et al. | |
| 2008/0219741 A1 | 9/2008 | McNestry | |
| 2008/0219742 A1 * | 9/2008 | McNestry | B41J 33/34 400/234 |
| 2008/0219743 A1 | 9/2008 | McNestry et al. | |
| 2009/0302143 A1 | 12/2009 | Bavang | |
| 2009/0309949 A1 | 12/2009 | Fukutani et al. | |
| 2010/0089962 A1 | 4/2010 | Mehlis et al. | |
| 2010/0172682 A1 | 7/2010 | Hart | |
| 2013/0039685 A1 | 2/2013 | Starkey et al. | |
| 2013/0215210 A1 | 8/2013 | McNestry et al. | |
| 2014/0025969 A1 | 1/2014 | Pan et al. | |

FOREIGN PATENT DOCUMENTS

| | | |
|---|---|---|
| EP | 1055521 | 5/2003 |
| FR | 2783459 | 3/2000 |
| GB | 1550218 | 8/1979 |
| GB | 2022018 | 12/1979 |
| GB | 2289441 | 11/1995 |
| GB | 2298821 | 9/1996 |
| GB | 2310405 | 8/1997 |
| GB | 2448302 | 10/2008 |
| GB | 2440676 | 12/2008 |
| GB | 2478725 | 9/2011 |
| GB | 2493541 | 2/2013 |
| JP | 62087382 | 4/1987 |
| JP | 6312568 | 11/1994 |
| JP | 8002078 | 1/1996 |
| JP | 08067045 | 3/1996 |
| JP | 9001906 | 1/1997 |
| JP | 04339680 | 10/2009 |
| JP | 04347659 | 10/2009 |
| WO | WO2002/022371 | 3/2002 |
| WO | WO2003/029013 | 4/2003 |
| WO | WO2008/107642 | 9/2008 |
| WO | WO2008107647 | 9/2008 |
| WO | WO2008107648 A1 | 9/2008 |
| WO | WO2008107650 | 9/2008 |
| WO | WO2011054074 | 5/2011 |
| WO | WO2013/021211 | 2/2013 |

OTHER PUBLICATIONS

U.S. Appl. No. 14/179,483, Office Action Summary dated Dec. 5, 2014, 17 pages.
U.S. Appl. No. 14/179,145, Office Action Summary dated Apr. 3, 2015, 18 pages.
U.S. Appl. No. 14/075,935, Office Action Summary dated Dec. 26, 2014, 12 pages.
U.S. Appl. No. 14/075,935, Reply to Action dated Dec. 26, 2014, filed Mar. 26, 2015, 7 pages.
Liu et al., "DLR's multisensory articulated Hand Part II: The Parallel Torque/Position Control System", Proceedings of the 1998 IEEE International Conference on Robotics & Automation, May 1998, pp. 2087-2093.
European Application No. 12758588.3, Communication of a notice of opposition, dated Nov. 7, 2017, 32 pages.
Liu et al., "DLR's multisensoly articulated Hand Part II: The Parallel Torque/Position Control System", Proceedings of the 1998 IEEE International Conference on Robotics & Automation, May 1998, pp. 2087-2093.
Hunt, Rowland, Intellectual Property Office, Search Report dated Jan. 17, 2012, GB Application No. GB1113777.5, 3 pages.
Authorized Officer Athina Nickitas-Etienne, International Preliminary Report on Patentability, International Application No. PCT/GB2012/051954, dated Feb. 11, 2014, 5 pages.
Communication pursuant to Rule 114(2) EPC dated Oct. 22, 2014, European Patent Application No. 12758588.3, Observations Pursuant to Article 115 EPC.
European Patent Application No. 12758588.3, Further Examination Report dated Nov. 26, 2014.
Communication from EP Intellectual Property Office dated Jul. 11, 2013, Observations pursuant to Section 21 of the Patents Act 1977, to be published by the USPTO.
Marc Collins, Intellectual Property Office, Third Party Observations regarding Application No. GB1302462.5, Jan. 6, 2015, 6 pages.
Thetmar Joosting, European Search Report, Application No. EP 13 19 2034, dated Mar. 25, 2014, 6 pages.

* cited by examiner

MOTOR CONTROL SYSTEM

CROSS REFERENCE TO RELATED APPLICATIONS

This application is a continuation of and claims the benefit of priority (under 35 USC 120) to U.S. patent application Ser. No. 13/237,802, filed on 20 Sep. 2011, and published as US Publication No. US 2013-0039685 A1, which claims the benefit of priority (under 35 USC 119) of UK Patent Application No. 1113777.5, filed 10 Aug. 2011; these prior applications are hereby incorporated by reference in their entirety.

BACKGROUND

This invention relates to a motor control system, a method of operating a motor control system, a tape drive including a motor control system, a method of operating such a tape drive and a printing apparatus including such a tape drive.

Such printing apparatus includes drive apparatus for moving the tape relative to the printhead, to present fresh tape, from which pixels of ink are yet to be removed, to the printhead, such that successive printing operations can be carried out. It has long been known to provide tape drives which include two spool supports, one of which supports a supply spool on which unused tape is initially wound, and the other of which supports a take-up spool, onto which the tape is wound after it has been used. Tape extends between the spools in a tape path. Each of the spool supports, and hence each of the spools of tape, is drivable by a respective motor.

It is known to provide thermal transfer printing apparatus in two different configurations. In the first, so called "intermittent" configuration, the substrate to be printed and the tape are held stationary during a printing operation, whilst the printhead is moved across the area of the substrate to be printed. Once the printing operation is complete, the printhead is lifted away from the tape, and the tape is advanced to present a fresh region of tape to the printhead for the next printing operation.

In the second, so called "continuous" configuration, the substrate to be printed moves substantially continuously and the tape is accelerated to match the speed of the tape before the printhead is brought into thermal contact with the tape and the printing operation is carried out. In this configuration, the printhead is maintained generally stationary during each printing operation.

It is known to interlace images, such that a previously used region of tape is reused, but in the second and/or subsequent printing operations, different pixels of ink are removed from the tape to create an image. In the case of a printing apparatus in continuous configuration, it is also preferable to accurately control the speed of the tape, to ensure that it matches the speed of the substrate. A typical thermal transfer printer operates with a substrate that advances at linear speeds between approximately 0.01 meter per second and approximately 2 meters per second. Typical substrate accelerations are up to approximately 12 meters per second per second.

Tape drives of various types have been proposed, for example a tape drive which includes a stepper motor for driving a take up spool so as to pull tape through along a tape path between a supply spool and the take up spool. Such a tape drive also includes a mechanical clutch for setting and maintaining the tension in the tape. Such tape drives are often mechanically complex and regular maintenance of the clutch is typically required. Furthermore, since the supply spool is operated at a fixed torque, the tension in the tape varies as the diameter of the supply spool varies over time.

Another example of a known tape drive is one in which a take up spool and a supply spool are rotated by respective stepper motors. The stepper motors are driven in a co-ordinated manner to transfer the tape from the supply spool to the take up spool and to accurately position the tape adjacent the printhead, whilst maintaining the tension in the tape. Various methods of determining and maintaining the tension of the tape have been proposed. Such methods typically require the measured tension in the tape to be compared with the desired tension, and for a correction to be applied. Therefore, such methods often incur a delay of at least one printing operation between the tension in the tape falling outside an acceptable range and the correction being applied.

A further example of a known tape drive includes a pressure roller in the tape path, which is driven by a motor. The roller directly controls the speed and position of the tape. The tape spools are driven through a mechanical clutch which maintains the tape tension between acceptable limits. Such tape drives are often mechanically complex. The tape drive is typically uni-directional and this tends to cause tape wastage.

A still further example of a known tape drive is one in which two DC motors are used to drive the spools of tape (as described in FR 2783459, for example). Both of the motors operate in torque control mode, and a roller which is positioned near to the printhead is used to determine the movement of the tape along the tape path. Such a tape drive includes rollers on the inked side of the tape which can require regular maintenance. Furthermore, desired printing speeds and tape accelerations are increasing, leading to difficulties in operating such a drive.

SUMMARY

This invention relates to a motor control system, a method of operating a motor control system, a tape drive including a motor control system, a method of operating such a tape drive and a printing apparatus including such a tape drive.

The invention can be particularly useful in relation to a printing apparatus which utilises a printing tape or "ribbon" which includes a web carrying marking medium, e.g. ink, and a printhead which, in use, removes marking medium from selected areas of the web to transfer the marking medium to a substrate to form an image, such as a picture or text.

More particularly, but not exclusively, the invention relates to a so called thermal transfer printing apparatus in which the printhead includes a plurality of thermal heating elements which are selectively energisable by a controller during printing to warm and soften pixels of ink from the tape and to transfer such pixels to the substrate. The printhead presses the tape against the substrate such that the pixels of ink contact the substrate before the web of the tape is peeled away, thus transferring the pixels of ink from the tape to the substrate.

The tape used in thermal transfer printers is thin. Therefore it is important to ensure that the tension in the tape extending between the two spools is maintained at a suitable value or within a suitable range of tensions, in particular to enable the web to peel cleanly away from the heated ink. Too much tension in the tape is likely to lead to the tape being deformed or broken, whilst too little tension will inhibit the correct operation of the device. A slack tape is likely to affect print quality.

In order to avoid wasting ink, whilst maintaining acceptable print quality, it is advantageous to be able accurately to control the movement of the tape, so as to position the next portion of tape to be used directly adjacent a portion of the tape from which the ink has previously been removed. It is desirable for a spacing between adjacent regions of tape from which pixels are removed to create an image, to be better than 1 mm. It is also important to ensure that the regions of tape from which ink is removed during successive printing operations do not overlap, so that the printhead does not attempt to remove ink from the same region of the tape more than once.

In accordance with the present invention, there is provided a motor control system including a motor having an associated rotary position encoder, and a controller for controlling the operation of the motor, wherein the motor is switchable between a first control mode wherein position is a dominant control parameter to a second control mode where torque is the dominant control parameter. The motor may be a brushless DC motor or other functionally comparable motor. This invention has been developed using brushless DC motors. These motors are known by other names, for example, AC servo motors. The invention is also applicable to motors known as Switched Reluctance motors (both with and without permanent magnets). These motors are all controlled by the use of a software controlled system which generates a rotating magnetic field, and as such are functionally comparable with one another.

A measurement of the velocity of the motor may be fed back to the controller and used to determine an output of the controller which is received by the motor to control the movement of the motor. When the motor is in the first control mode, the controller may receive an input relating to a demanded position of the motor and an actual position of the motor, and may determine a change in position which is required to be carried out by the motor. In addition, the controller may use the change in position, the velocity of the motor and a torque bias value, to determine the output of the controller which controls the movement of the motor.

When the motor is in the second control mode, the controller may receive an input relating to a torque bias value which is used to determine an output of the controller which controls movement of the motor. The controller may receive an input relating to the velocity of the motor which is used in conjunction with the torque bias value to determine the output of the controller which controls movement of the motor.

The motor control system may include a pair of motors, each having an associated sensor and the controller controlling operation of both of the motors such that at least one is switchable between the first control mode and the second control mode. Each of the motors may be a brushless DC motor or other functionally comparable motor. Each sensor may enable the controller to determine the position and velocity of a rotor of the respective motor. Moreover, switching between the first control mode and the second control mode may be a smooth transition.

According to a second aspect of the invention, there is provided a method of operating a motor control system according to the first aspect of the invention, wherein the method may include providing an input to the controller relating to a torque bias, to determine the motor torque developed by the motor. The method may include using a user input to adjust the ratio of each control mode of the motor.

The method may include testing an accuracy of the control of the motor. The control system may be used to control a pair of motors, and the method may include determining a ratio of torques applied to the motors. The method may include determining a number of steps moved by the motor as it moves between a target position and a rest position.

According to a third aspect of the invention, there is provided a tape drive including a pair of tape spool supports, upon one of which a supply spool is mountable and upon a second one of which a take up spool is mountable, each tape spool support being drivable by a respective motor which has an associated sensor, the tape drive further including a controller to control each of the motors, wherein at least one of the motors is switchable between a first control mode wherein position is a dominant control parameter and a second control mode wherein torque is the dominant control parameter. Both of the motors may be switchable between the first control mode and the second control mode. Both motors may be drivable in the first control mode during movement of tape between the tape spool supports, and wherein at least one of the motors is switchable from the first control mode to the second control mode when the movement of the tape has been completed, and from the second control mode to the first control mode when tape movement is to be carried out. Moreover, a transition of the control mode of the motor between the first control mode and the second control mode may be smooth.

According to a fourth aspect of the invention, there is provided a method of operating a tape drive according to the third aspect of the invention, the method including maintaining tension in tape extending between the two spools, when the tape is substantially stationary, by operating one motor in the first control mode whilst operating the other motor in the second control mode. The method may include switching the motor which was in the second control mode whilst the tape was stationary into the first control mode in order to transfer tape between the spools.

The method may include determining estimated values of diameters of each of the spools and updating the estimated values of the diameters during use of the tape drive. The method may include testing an accuracy of the control of the motors by determining a ratio of torques applied to the motors and comparing the ratio of the torques with a ratio of estimated diameters of the two spools. The method may include testing an accuracy of the control of the motors by monitoring a number of steps taken by a motor between a target position and a rest position. The method may include driving the motors so as to release tension from tape extending between the spools before power is removed from the motors.

According to a fifth aspect of the invention, there is provided printing apparatus including a tape drive according to the third aspect of the invention.

BRIEF DESCRIPTION OF THE DRAWINGS

Embodiments of the invention will now be described, by way of example only, with reference to the accompanying drawings, in which.

DETAILED DESCRIPTION

Figure 1:
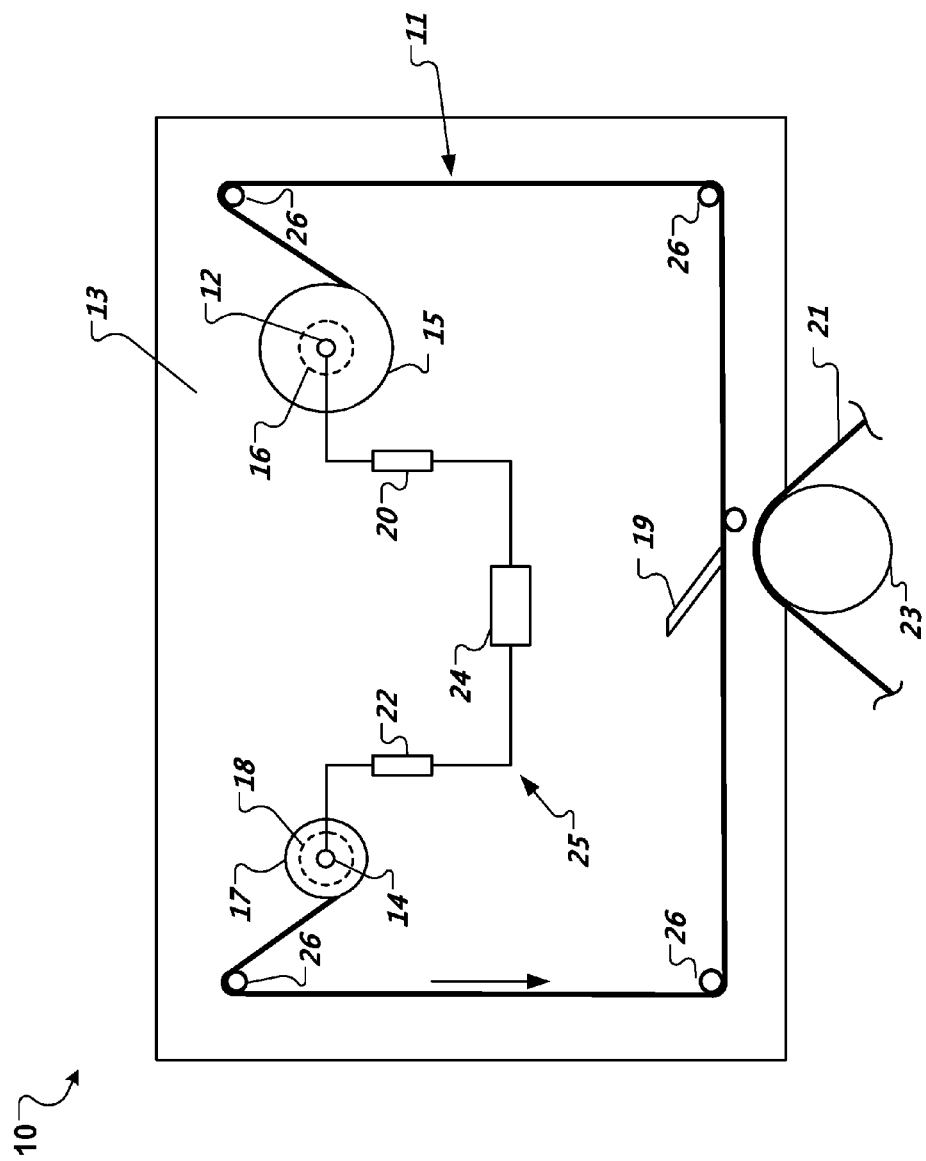
FIG. 1 is an illustrative view of part of a thermal printing apparatus including a motor control system according to the present invention.

Referring to FIG. 1, there is shown a part of a printing apparatus 10. The printing apparatus 10 includes a tape drive shown generally at 11. The printing apparatus includes a housing 13, in or on which is mounted a first spool support 12 and a second spool support 14, which form part of the tape drive 11. A spool of tape 15, 17, for example inked printer ribbon, is mountable on each of the supports 12, 14. The spool supports 12, 14 are spaced laterally from one another. The printing apparatus 10 also includes a printhead 19 for transferring ink from the tape to a substrate 21 which is entrained around a roller 23 adjacent the printhead 19. Depending upon the configuration of the printer, the substrate 21 may be positioned adjacent the printhead 19 on a platen, rather than a roller.

Each of the spool supports 12, 14 is independently drivable by a respective motor 16, 18. Each of the motors 16, 18 is a brushless DC motor. Each of the spool supports 12, 14 is rotatable clockwise and anti-clockwise by means of its respective motor 16, 18. Each motor 16, 18 is electrically connected to a controller 24 via a sensor 20, 22. This sensor is typically a rotary encoder although it will be appreciated that other technologies are perfectly acceptable. The controller 24 is operable to control the mode of operation of each of the motors 16, 18 and the amount of drive provided by each of the motors 16, 18. Each sensor 20, 22 enables the controller 24 to determine the angular position and rotational speed of a rotor of each respective motor 16, 18. Information relating to the current drawn by each motor 16, 18 is provided to the controller 24. The motors 16, 18, the sensors 20, 22 and the controller 24 all form part of a motor control system 25.

The controller 24 receives inputs relating to a demanded position of each motor 16, 18 to advance the tape to a required position, the actual position of the motor 16, 18, the measured velocity of each motor 16, 18, the current drawn by the motor 16, 18, and a torque bias $T_B$ required by the motor at a given point in time. The purpose of the torque bias will be explained in more detail below. The position of the controller 24 relative to the remainder of the printing apparatus 10 is irrelevant for the purposes of the present invention.

In use, a supply spool 17, upon which unused tape is wound, is mounted on the spool support 14, and a take up spool 15, upon which used tape is wound, is mounted on the spool support 12. The tape generally advances in a tape path between the supply spool 17 towards the take up spool 15. The tape is guided in the tape path between the spools 15, 17 adjacent the printhead 19 by guide members 26.

The tape drive 11 should be calibrated before printing operations commence. Such calibration is generally required when the printing apparatus 10 is switched on, and when the spools of tape 15, 17 are replaced. The calibration process includes determining an initial estimate of the diameters of each of the spools of tape 15, 17 mounted on the spool supports 12, 14. An example of a suitable method of obtaining such an estimate is described in detail in the applicant's patent GB2310405. As tape passes from one spool to the other, for example from the supply spool 15 to the take up spool 17, it passes over a roller of known diameter. The roller is preferably one of the guide members 26. Tape is drawn from the supply spool 17, with the motor 16 which drives the take-up spool support 12 operating in position control mode. The motor 18 which drives the supply spool support 14 operates in torque control mode to deliver a predetermined torque.

Following the calibration process, the motor control system 25 maintains and updates values for the diameters of the spools 15, 17 by monitoring the amount of tape transferred from the supply spool to the take-up spool. The controller 24 takes into account the thickness of the tape to compute an expected change in the diameters of the spools 15, 17 over a period of time. This technique relies on the tension in the tape being kept substantially constant during printing operations and advancement of the tape between the spools 15, 17.

When the tape is at rest, the motor control system 25 maintains the desired tape tension by operating one motor, for example the supply spool motor 18, in a first control mode, in which position is a dominant control parameter. This first control mode will be referred to herein as "position control mode". The other motor, for example the take up spool motor 16, is operated in a second control mode, in which the dominant control parameter is torque. The second control mode will be referred to herein as "torque control mode".

Therefore the tape drive 13 operates in a similar fashion to one in which one of the motors 16, 18 is a stepper motor and the other motor 16, 18 is a DC motor. One motor 18 ensures that the absolute position of the tape relative to the printhead is accurately controlled, whilst the other motor 16 maintains the tension in the tape at the desired predetermined value.

A demanded position $P_D$ of the motor 18 is received by an S-curve generator 28, an output of which is used, along with an actual position $P_A$ of the motor 18 in an algorithm, preferably a PID (Proportional-Integral-Derivative) algorithm, applied by an electronic filter 29 to determine the change in position required to be carried out by the motor 18. An actual velocity $V_A$ of the motor is input to a second electronic filter 31, which performs an algorithm, again preferably a PID algorithm, and an output of the second electronic filter 31 is used in conjunction with an output of the first electronic filter 29, relating to the change in position of the motor 18, to determine a demanded torque $T_D$ to be provided by the motor 18. A demanded torque $T_D$ and the amount of current A drawn by the motor 18 are fed back to a torque controller 30 to provide a control output to the motor 18. Although the algorithms implemented by the filters 29, 31 are described as being PID algorithms, it will be appreciated that any Linear Time Invariant filter function may be used.

Figure 2:
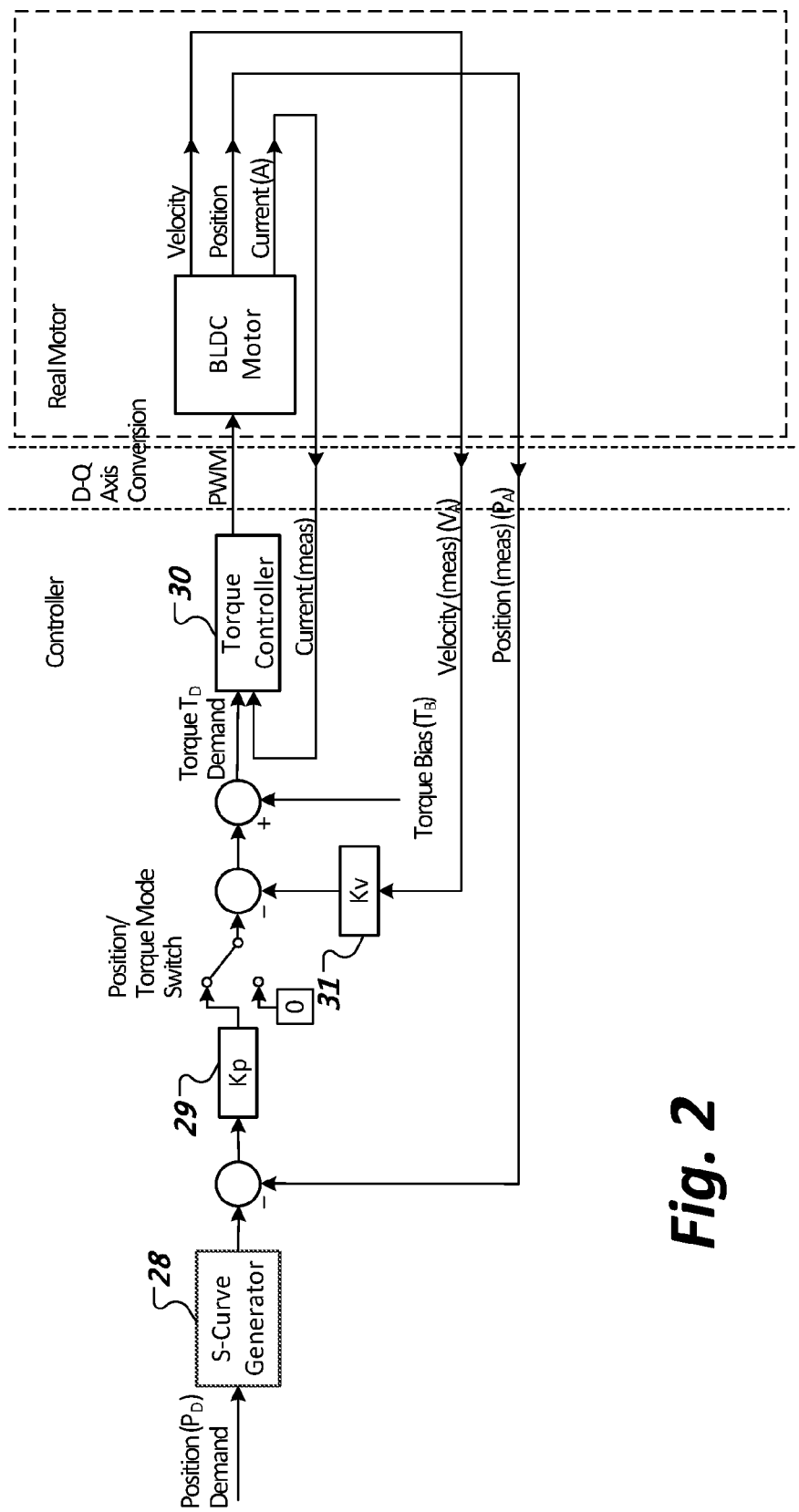
FIG. 2 is an illustrative view of a feedback circuit of the motor control system.

The motor 16 being operated in torque control mode does not use inputs relating to demanded position $P_D$ or actual position $P_A$ of the motor 16. The inputs relating to actual velocity $V_A$ may also be disregarded. The torque controller 30 receives a torque demand $T_D$ based only on the torque bias $T_B$, and optionally upon the actual velocity $V_A$ of the motor 16. The current A of the motor 16 may also be fed back to the torque controller 30 to generate a control output for the motor 16, such as the BLDC (Brushless Direct Current) motor shown in FIG. 2.

When the tape is required to be advanced between the spools 15, 17, the controller 24 causes both of the motors 16, 18 to operate in position control mode. The transition of the motor 16, 18 which was previously operated in torque control mode into position control mode is smooth. This transition from torque control mode to position control mode is carried out by gradually reducing the torque bias $T_B$ to a nominal value, which may be zero.

During tape advance, the two motors 16, 18 advance the tape accurately along the tape path past the printhead 19, using the values of the diameters of the spools 15, 17 and a co-ordinated moving target position. The co-ordinated moving target position is arrived at by the control system 25 determining the desired position of the tape at a point in time, and the controller 24 controls the motors 16, 18 to achieve this desired position of the tape.

During tape advance, it is desirable for the amount of tape fed into the tape path from the supply spool 17 to be equal to the amount of tape taken up by the take up spool 15, in order to maintain the tape tension substantially constant. However, this is difficult to achieve in known tape drives because disturbances of the tape which occur during printing operations, and the fact that the spools 15, 17 are not perfectly cylindrical, mean that the control of the motors 16, 18 is based upon inaccurate estimates, and thus the tension is unlikely to be kept as near to constant as desired. In the present invention, the smooth transition of the take up motor from position control mode to torque control mode prevents the accumulation of such errors increasing long term drift in the ribbon tension.

Once the advancement of the tape has been completed, one of the spool motors 16, 18, for example the take up spool motor 16, smoothly transitions from position control mode to torque control mode, by increasing the torque bias $T_B$ relating to the motor 16, whilst the other spool motor, for example the supply spool motor 18, remains in position control mode. Gradually increasing the torque bias $T_B$ from zero during deceleration of the tape causes a smooth transition of the motor from position control mode to torque control mode, before the inputs relating to position $P_A$, $P_D$ are disregarded. The other motor, in this case the supply spool motor 18, remains in position control mode, however the value of torque bias $T_B$ applied to this motor may be adjusted, so as to compensate for the increase in torque which is likely to be caused as a result of switching the take up spool motor 16 into torque control mode. In practice, it may be possible to retain a constant torque bias $T_B$ irrespective of whether the motors 16, 18 are stationary or in motion, however, the desired torque bias $T_B$ will be such that it causes the tension in the tape to remain substantially constant, by the two motors 16, 18 applying equal and opposite forces on the tape.

The motor control system 25 is capable of testing the accuracy of its control of the advancement of the tape in two ways.

The first method of testing is to determine the ratio of the torques applied to the two motors 16, 18 when the tape drive 11 is stationary. In such a situation, one motor 16, 18 is stationary, whilst the other motor 16, 18 supplies a torque so as to maintain its position, and to maintain the tension in the tape. The ratio of the torques should be the same as the ratio of the diameters of the spools 15, 17 at that time.

The second method of testing is carried out as the tape drive 11 is completing a movement of the tape. As the take up spool motor 16 transitions from position control mode to torque control mode, the controller 24 monitors the angular position change of take up spool motor 16 between its expected target position and its rest position at the correct ribbon tension, using the sensor 20. The angular position change that occurs together with the spool diameter gives a measure of the disturbances and errors in the position control of the motor 16.

The operation of the control system 25 is iterative, in that it takes into account the results of the testing method(s) carried out over a number of tape advancements (printing cycles) to correct the estimate of the diameters of the spools 15, 17 for future printing cycles.

The method of operation of the tape drive 11 described above retains the supply spool motor 18 in position control, as the supply spool 17 is more likely to be cylindrical than the take up spool, the tape on the supply spool 17 not having been unwound, and ink removed from it before being rewound on a different spool. Therefore this mode of operation is more likely to provide accurate positioning of the tape adjacent the printhead 19. However, it will be appreciated that either spool motor 16, 18 could be switched to torque control mode during tape advance.

When power is removed from the motors 16, 18, the control system 25 manages the tension of the tape in the tape path. If the tape is in tension when power is removed from the motors 16, 18, one or both of the spools 15, 17 will be accelerated by the force exerted by the tension in the tape. Even when the tape is no longer in tension, each spool 15, 17 which has been accelerated will continue to rotate owing to the momentum of the spool(s) 15, 17, and tape may spill from the printing apparatus 10. Of course, this is undesirable, and unacceptable. To overcome this problem, the control system 25 operates at least one of the motors 16, 18, so as to enable a controlled release of tension from the tape, before power is removed from the motors 16, 18. Alternatively, a mechanical device may be used to inhibit or prevent the acceleration of the spools 15, 17 upon removal of power from the motors 16, 18.

Whilst the invention has been described in relation to thermal printing apparatus, it will be appreciated that the motor control system may be utilised in relation to other devices or apparatus.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A motor control system comprising:
a position controller to receive a demanded position ($P_D$) input for controlling a motor;
a torque controller coupled with the position controller, the torque controller to receive a torque bias ($T_B$) input for controlling the motor;
a switch coupled between the position controller and the torque controller; and
a feedback circuit coupled with the torque controller and the position controller;
wherein the feedback circuit is configured and arranged to combine an output from the position controller, the output being generated based on the demanded position ($P_D$) input, with the torque bias ($T_B$) input to generate a torque demand ($T_D$) input to the torque controller; and
wherein the motor control system is configured to allow the switch to disconnect the output of the position controller from the torque controller during a torque control mode, such that the torque demand ($T_D$) input is generated from the torque bias ($T_B$) input, without being affected by the demanded position ($P_D$) input or an actual position of the motor, during the torque control mode; and allow the switch to connect the position controller with the torque controller and reduce the torque bias ($T_B$) input to transition from the torque control mode to a position control mode.

2. The motor control system of claim 1, wherein the feedback circuit comprises an electronic filter configured to receive a velocity ($V_A$) measurement of the motor to adjust the output from the position controller before combination with the torque bias ($T_B$) input.

3. The motor control system of claim 2, wherein the electronic filter is a first electronic filter, and the position controller comprises an S-curve generator and a second electronic filter, wherein the feedback circuit is configured to provide an actual position ($P_A$) measurement of the motor to adjust an output of the S-curve generator before provision to the second electronic filter.

4. The motor control system of claim 1, wherein the motor control system is further configured to increase the torque bias ($T_B$) input from zero or a nominal value during transition from the position control mode to the torque control mode to prevent accumulation of tape feed errors.

5. The motor control system of claim 4, wherein the motor control system is further configured to adjust the torque bias ($T_B$) input when the motor is operated in the position control mode to compensate for an increase in torque caused by another motor, which is controlled by the motor control system, being switched from the position control mode to the torque control mode.

6. The motor control system of claim 1, wherein the feedback circuit comprises an electronic filter configured to receive a velocity ($V_A$) measurement of the motor to affect the torque demand ($T_D$) input generated from the torque bias ($T_B$) input during the torque control mode.

7. The motor control system of claim 6, wherein the motor is a brushless DC (Direct Current) motor, and the torque controller is configured to receive a measurement of current from the brushless DC motor to control an output provided by the torque controller to the brushless DC motor.

8. A printing apparatus comprising:
a printhead;
a first spool support on which a supply spool is mountable;
a second spool support on which a take up spool is mountable;
a first motor coupled with the first spool support;
a second motor coupled with the second spool support; and
a motor control system coupled with the first motor and with the second motor, the motor control system configured to drive the first and second motors to move a tape between the supply spool and the take up spool, and with respect to the printhead for printing;
wherein the motor control system comprises, for at least one of the first and second motors, (i) a position controller coupled with the at least one motor, the position controller to receive a demanded position ($P_D$) input for controlling the at least one motor, (ii) a torque controller coupled between the at least one motor and the position controller, the torque controller to receive a torque bias ($T_B$) input for controlling the at least one motor, (iii) a switch coupled between the position controller and the torque controller, and (iv) a feedback circuit coupled with the at least one motor, the torque controller, and the position controller, wherein the feedback circuit is configured and arranged to combine an output from the position controller, the output being generated based on the demanded position ($P_D$) input, with the torque bias ($T_B$) input to generate a torque demand ($T_D$) input to the torque controller, and the motor control system is configured to allow the switch to disconnect the output of the position controller from the torque controller during a torque control mode, such that the torque demand ($T_D$) input is generated from the torque bias ($T_B$) input, without being affected by the demanded position ($P_D$) input or an actual position of the at least one motor, during the torque control mode; and allow the switch to connect the position controller with the torque controller and reduce the torque bias ($T_B$) input to transition from the torque control mode to a position control mode.

9. The printing apparatus of claim 8, wherein the feedback circuit comprises an electronic filter configured to receive a velocity ($V_A$) measurement of the at least one motor to adjust the output from the position controller before combination with the torque bias ($T_B$) input.

10. The printing apparatus of claim 9, wherein the electronic filter is a first electronic filter, and the position controller comprises an S-curve generator and a second electronic filter, wherein the feedback circuit is configured and arranged to provide an actual position ($P_A$) measurement of the at least one motor to adjust an output of the S-curve generator before provision to the second electronic filter.

11. The printing apparatus of claim 8, wherein the motor control system is further configured to increase the torque bias ($T_B$) input from zero or a nominal value during transition from the position control mode to the torque control mode to prevent accumulation of tape feed errors.

12. The printing apparatus of claim 11, wherein the motor control system comprises a position controller, a torque controller and a feedback circuit for each of the first and second motors, and wherein the motor control system is further configured to adjust the torque bias ($T_B$) input for the supply spool motor, when operated in the position control mode, to compensate for an increase in torque caused by the take up spool motor being switched from the position control mode to the torque control mode.

13. The printing apparatus of claim 12, wherein the feedback circuit, for each of the first and second motors, comprises an electronic filter configured to receive a velocity ($V_A$) measurement of the at least one motor to affect the torque demand ($T_D$) input generated from the torque bias ($T_B$) input during the torque control mode.

14. The printing apparatus of claim 13, wherein each of the first and second motors is a brushless DC (Direct Current) motor, and the torque controller for each of the first and second motors is configured and arranged to receive a measurement of current from a respective brushless DC motor to control an output provided by the torque controller to the respective brushless DC motor.

15. A method comprising:
receiving, at a position controller, a demanded position ($P_D$) input for controlling a motor;
generating an output from the position controller based on the demanded position ($P_D$) input;
receiving a torque bias ($T_B$) input for controlling the motor;
combining the output from the position controller with the torque bias ($T_B$) input to generate a torque demand ($T_D$) input to a torque controller;
generating, at the torque controller, a torque control output for the motor based on the torque demand ($T_D$) input disconnecting the output of the position controller from the torque controller during a torque control mode, such that the torque demand ($T_D$) input is generated from the torque bias ($T_B$) input, without being affected by the demanded position ($P_D$) input or an actual position of the motor, during the torque control mode;

connecting the position controller with the torque controller; and reducing the torque bias ($T_B$) input to transition from the torque control mode to a position control mode.

16. The method of claim 15, wherein generating the output from the position controller comprises:

using a Linear Time Invariant filter function with an output of an S-curve generator and a received actual position ($P_A$) measurement of the motor to determine a first output indicating a change in position required to be carried out by the motor;

using a Linear Time Invariant filter function with a received velocity ($V_A$) measurement of the motor to determine a second output; and using the second output in conjunction with the first output to determine a demanded torque to be provided by the motor.

17. The method of claim 16, wherein using a Linear Time Invariant filter function with the output of the S-curve generator and the received actual position ($P_A$) measurement of the motor comprises performing a PID (Proportional-Integral-Derivative) algorithm using the output of the S-curve generator and the received actual position ($P_A$) measurement of the motor, and wherein using a Linear Time Invariant filter function with the received velocity ($V_A$) measurement of the motor comprises performing a PID (Proportional-Integral-Derivative) algorithm using the received velocity ($V_A$) measurement of the motor.

18. The method of claim 15, comprising:

increasing the torque bias ($T_B$) input from zero or a nominal value during transition from the position control mode to the torque control mode to prevent accumulation of tape feed errors.

19. The method of claim 18, comprising adjusting the torque bias ($T_B$) input when the motor is operated in the position control mode to compensate for an increase in torque caused by another controlled motor being switched from the position control mode to the torque control mode.

* * * * *